Jan. 9, 1968    H. STAEGER ET AL    3,362,739
CONNECTING ELEMENTS FOR PANELS OR THE LIKE
Filed Oct. 21, 1964    2 Sheets-Sheet 2

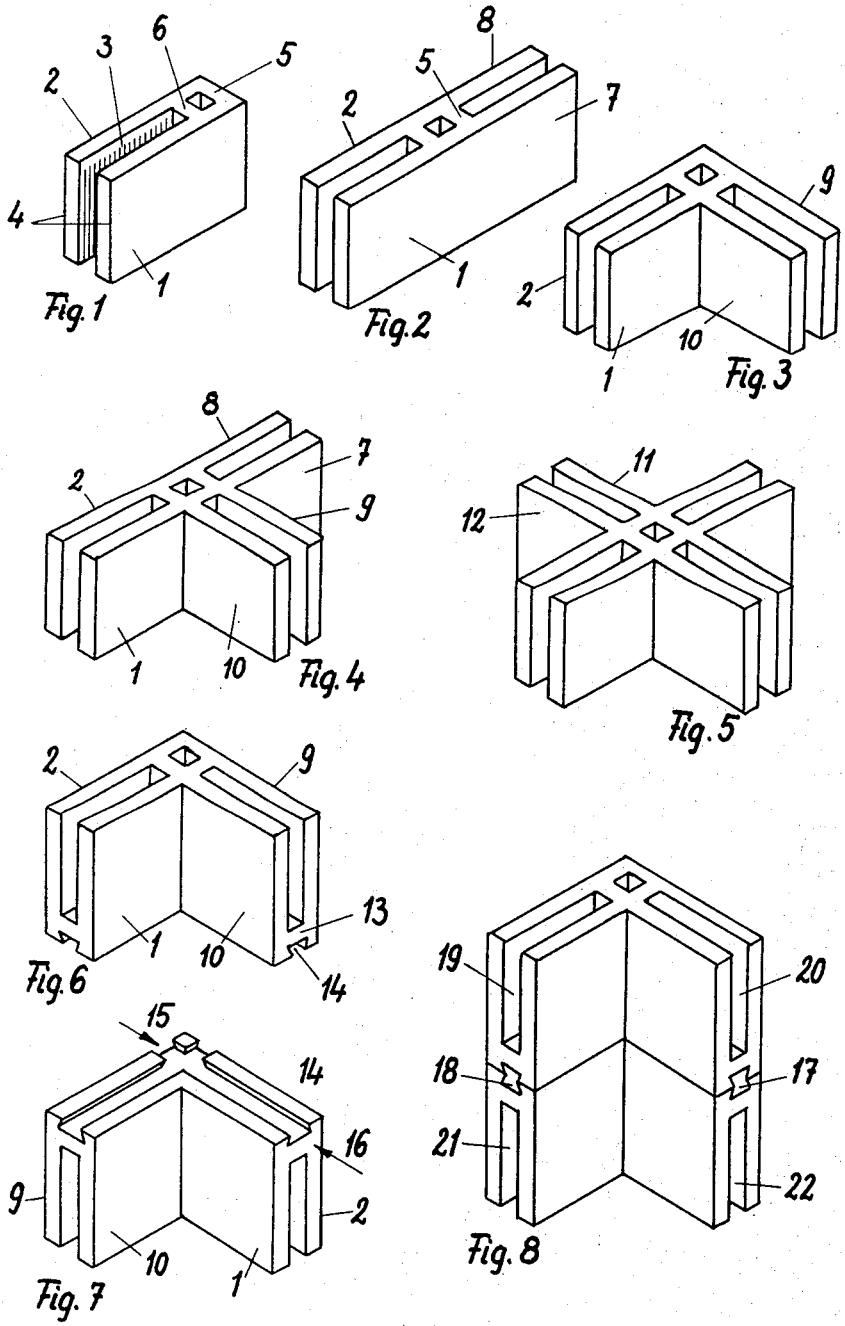

INVENTORS
HANS STAEGER
MANFRED MALZACHER

BY  Dicke & Craig
ATTORNEYS

United States Patent Office 3,362,739
Patented Jan. 9, 1968

3,362,739
CONNECTING ELEMENTS FOR PANELS
OR THE LIKE
Hans Staeger, Friedrich-List-Strasse 25, Fellbach, Stuttgart, Germany, and Manfred Malzacher, Brentenwaldstrasse 20, Stuttgart-Hohenheim, Germany
Filed Oct. 21, 1964, Ser. No. 405,397
Claims priority, application Germany, Aug. 8, 1964, 17,602
5 Claims. (Cl. 287—20.92)

ABSTRACT OF THE DISCLOSURE

Connecting elements for plates, panels, boards, or the like, for use in the erection of temporary structures, wherein the connecting elements consist of at least one pair of parallel walls spaced from each other at a distance substantially equal to the thickness of the boards or panels to be inserted between them and are secured to each other only by connecting parts; especially, connecting parts of this type which are provided additionally with dove-tail type recesses for coupling the connecting elements to additional connecting elements.

The present invention relates to connecting elements for plates, panels, boards, or the like which may be employed, for example, to serve as partitions, as surfaces for advertising and for many other purposes, and have to be secured only at their outer corners or edges.

There are frequent occasions when large panels have to be erected for temporary use, for example, to form stalls for fairs or exhibitions, or when boards have to be put up to form temporary racks, stands, or shelves or scaffolds for pictures or drawings which are mounted on boards. Generally, the components for such structures are to be used repeatedly either in the same or different combinations and they should be designed so as to be very quickly assembled and disassembled without requiring any skilled workers for doing so.

The connecting elements which are already known for this purpose are made, for example, of a cubical shape and the corners are provided with slots into which the edges of the boards or panels may be inserted. Such a connecting element is necessarily very heavy and voluminous. Although theoretically it is capable of taking up twelve panels at the same time, it is much too large and expensive if it is to be used for connecting, for example, only two panels to each other. Furthermore, the amount of material required for producing such a connecting element also renders it very expensive.

It is an object of the present invention to provide a connecting element of the type and for the purposes as above described which overcomes the mentioned disadvantages of the connecting elements as are already known in the piror art. This object is attained according to the invention by designing the connecting element so as to consist of at least one pair of parallel walls which are spaced from each other at a distance substantially equal to the thickness of the boards or panels to be inserted between them and are secured to each other only by connecting parts. A very simple manner of securing the two parallel walls to each other consists of providing a transverse connecting web at one side of and extending at right angles to these walls.

Another feature of the invention consists in roughening one or more inner surfaces of each pair of walls or providing them with grooves or serrations for the purposes of improving the adhesion of the corners of the boards or panels within the connecting element and for thus attaining a firm connection between them and the connecting element.

Another very preferred feature of the invention consists in providing a connecting element which consists of two pairs of walls which extend in opposite directions from their connecting web or in providing the connecting element with two pairs of walls which extend at right angles to each other and are secured to each other at their connecting webs. In the same manner it is possible to form a connecting element in which four pairs of walls are secured to each other in a crosswise arrangement.

Another feature of the invention consists in providing the connecting web or webs between the pair or pairs of walls of one connecting element with suitable means for securing one or more additional pairs of walls thereto. The connecting web or webs are for this purpose preferably provided with dovetailed recesses into which one or more rods with dovetailed projections on opposite sides may be inserted to secure two or more connecting elements of the same type to each other so as to form a single connecting unit for connecting a larger number of boards or panels to each other. According to another feature of the invention, the transverse connecting web or webs are provided at the upper or lower horizontal side of the parallel walls, and a base plate which extends at right angles to the walls is integrally secured thereto in horizontal alignment with the transverse web or webs. This base plate is preferably of a rectangular shape and of a width corresponding to that of the walls to which it is connected. When two connecting elements are secured to each other by a dovetailed connecting rod, the horizontal base plates of the two elements will be spaced from each other at a distance equal to the thickness of a board or panel which may then be inserted between them.

The connecting elements according to the invention may be produced very simply and inexpensively on a mass-production scale by being made of a resilient plastic by injection molding.

The features and advantages of the invention will become more clearly apparent from the following detailed description thereof which is to be read with reference to the accompanying drawings, in which—

FIGURE 1 shows a perspective view of the basic connecting element with one pair of parallel walls;

FIGURE 2 shows a similar view of a connecting element with two pairs of walls extending in opposite directions;

FIGURE 3 shows a similar view of an angular connecting element;

FIGURE 4 shows a similar view of a connecting element with two pairs of walls extending in opposite directions and a third pair of walls extending at right angles thereto;

FIGURE 5 shows a connecting element with four pairs of walls in a crosswise arrangement;

FIGURE 6 shows an angular connecting element similar to that according to FIGURE 3, but also provided on its lower side with a transverse connecting web with a dovetailed recess therein;

FIGURE 7 shows a bottom view of the connecting element according to FIGURE 6;

FIGURE 8 shows two connecting elements according to FIGURES 6 and 7 secured to each other by connecting rods with dovetailed projections on their opposite sides;

Figure 10:
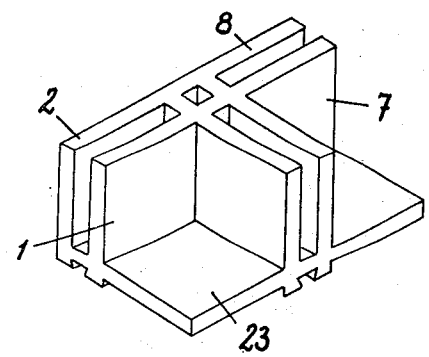
Figure 11:
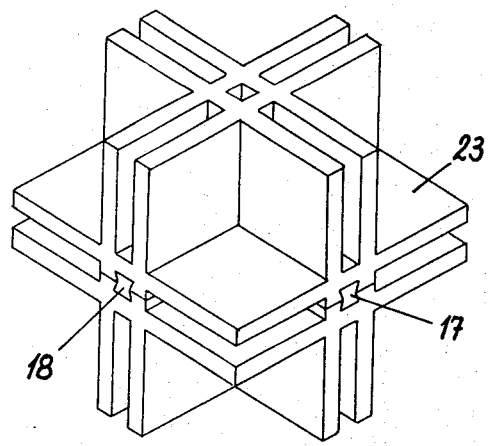

FIGURE 10 shows a connecting element similar to that according to FIGURE 4, but provided with a lower connecting web and a dovetailed recess therein and with a pair of base plates; while FIGURE 11 shows two cross-shaped connecting elements similar to the elment according to FIGURE 5 which are provided with base plates and are secured to each other by dovetailed connecting rods so as to form a single unit.

The most simple form of the connecting element accord to the invention is illustrated in FIGURE 1 of the drawings and it consists of a pair of rectangular walls 1 and 2 which are parallel to and spaced from each other at a distance which is substantially equal to the thickness of the boards or panels which are to be inserted with their edges between them. The inner surfaces of the two walls 1 and 2 are provided with serrations 3 consisting of lines of teeth which extend parallel to the front edges 4. At their rear ends the plates 1 and 2 are connected to each other by a pair of transverse webs 5 and 6 which extend at right angles to the walls 1 and 2.

According to FIGURE 2, the walls 1 and 2 of the basic connecting element as shown in FIGURE 1 are extended beyond the transverse web 5 so as to form a second pair of walls 7 and 8 which extend in the opposite direction to the first pair. The outer sides of walls 1 and 7 therefore form one continuous straight surface and the same applies to the outer sides of walls 2 and 8.

The angular connecting element as illustrated in FIGURE 3 again consists of the basic element as shown in FIGURE 1 to which another pair of walls 9 and 10 are connected within the plane of the transverse webs 5 and 6 so that the two pairs of walls 1, 2 and 3, 4 extend at right angles to each other.

The connecting element according to FIGURE 4 is a combination of the elements as shown in FIGURES 1 to 3 and ttherefore consists of three pairs of integrally connected walls 1 and 2, 7 and 8 and 9 and 10, the last pair extending at right angles to the others and within the plane of the transverse webs 5 and 6. If this last pair of walls 9 and 10 is also extended in the opposite direction beyond the webs 5 and 6 so as to form two further walls 11 and 12, a connecting element will be formed as shown in FIGURE 5 in which four pairs of walls extend crosswise to each other and each pair at right angles to the adjacent pair.

FIGURE 6 shows a modification of the connecting element according to FIGURE 3, in which the lower ends of the walls 1 and 2 as well as of the walls 9 and 10 are connected to each other by transverse webs 13 which are provided at their lower sides with dovetailed recesses 14. As may be seen in the bottom view of this connecting element according to FIGURE 7, the dovetailed recesses 14 extend along the entire length of the lower side of both pairs of walls 1, 2 and 9, 10 and cross each other at one end. Thus, a dovetailed connecting rod may be inserted into each of the dovetailed recesses 14 in one or the other direction as shown by the arrows 15 and 16.

FIGURE 8 illustrates the two connecting elements according to FIGURES 6 and 7 secured to each other by connecting rods 17 and 18 with dovetailed projections on their opposite sides so as to form a single connecting unit which may be used for joining, for example, two upper and two lower boards or panels at right angles to each other when the corners of the latter are inserted into the slots 19, 20, 21 and 22 between the different pairs of walls.

Figure 9:
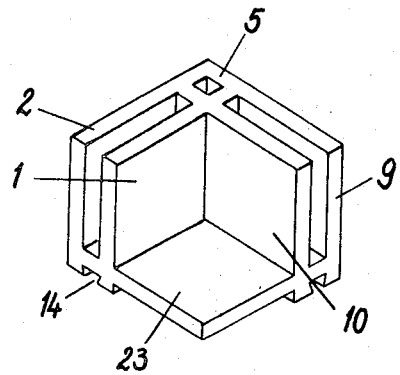
FIGURE 9 shows a connecting element similar to that according to FIGURE 6, but additionally provided with a base plate.

FIGURE 9 shows a modification of the angular connecting element according to FIGURE 6, in which a rectangular base plate 23 is secured in alignment with the lower transverse webs 13 to the inner walls 1 and 10 so as to extend at right angles to the latter. The outer edges of this base plate 23 are also in alignment with the vertical outer ends of the two pairs of walls 1, 2 and 9, 10. The lower transverse webs 13 are again provided with continuous dovetailed recesses 14 into which two dovetailed connecting rods 17 and 18 may be inserted in the same manner as shown in FIGURE 8 in order to secure two connecting elements to each other.

FIGURE 10 shows a T-shaped and FIGURE 11 a cross-shaped connecting element similar to that according to FIGURE 9. FIGURE 11 further shows that, when two similar connecting elements are secured to each other by the dovetailed connecting rods 17 and 18, not only four upper and four lower perpendicular boards or panels may be inserted into the connecting unit, but that also four horizontal boards or panels may be inserted between the horizontal base plates 23. This, of course, applies similarly to the connecting elements according to FIGURES 9 and 10 which when secured by dovetailed connecting rods to similar elements permit not only two or three perpendicular boards or panels, but also one or two horizontal boards or panels to be inserted therein.

Of course, instead of connecting the different pairs of perpendicular walls of any of the connecting elements as shown in the drawings integrally to each other so as to extend in opposite directions or at right angles to each other, it is also possible to provide their perpendicular connecting webs 5 and 6 with dovetailed recesses similar to the recesses 14 to permit them to be removably secured to each other by dovetailed connecting rods similar to the rods 18.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A connecting element for plates, panels, boards, or the like, for the construction of temporary structures, comprising at least one pair of parallel walls spaced from each other at a distance substantially equal to the thickness of the plates or the like to be inserted between them, and a transverse connecting web extending between said pair of parallel walls at right angles thereto, said connecting web securing said parallel walls integrally to each other, said transverse connecting web being located parallel to and in the region of one edge of said pair of parallel walls, further comprising means on at least one outer side of said connecting web for removably securing thereto at least one other connecting element similar to said first element, said means including a recess and a symmetric key member adapted to be received in the recesses of two adjacent connecting elements.

2. A connecting element as defined in claim 1, in which said connecting web has in at least one outer side thereof a dovetailed recess extending longitudinally in the direction of said web for removably securing thereto another connecting element similar to said first element, and a connecting rod being dovetailed on two opposite longitudinal sides thereof adapted to be inserted into said dovetailed recesses of the adjacent connecting elements.

3. A connecting element for plates, panels, boards, or the like comprising at least one pair of parallel walls spaced from each other at a distance substantially equal to the thickness of the plates or the like to be inserted between them, a transverse connecting web at least on one side of and securing said walls integrally to each other and extending at right angles thereto, a second transverse connecting web extending at right angles from said first web at one end thereof and also securing said walls integrally to each other along another side thereof extending at right angles to said first side, in which at least said second connecting web has at least in its outer side opposite to said first walls a dovetailed recess extending longitudinally in the direction of said second web for removably securing thereto another connecting element similar to said first element, and a connecting rod being dovetailed on two opposite longitudinal sides thereof adapted to be inserted into said dovetailed recesses of the adjacent connecting elements.

4. A connecting element as defined in 3, in which said second connecting web connects said walls at the lower side thereof and contains said dovetailed recess in its lower side, and further comprising at least one base plate integrally secured to a lateral side of said connecting web but at a small distance from said lower side of said web and extending at right angles to said walls, whereby when two similar connecting elements extending inversely to each other are connected to each other by said connecting rod, said base plates of said two elements will also be parallel to and spaced from each other at a distance substantially equal to the thickness of a plate or the like to be inserted between them.

5. A connecting element as defined in claim 4, in which said base plate has a width equal to the width of said walls.

References Cited

UNITED STATES PATENTS

| 1,290,740 | 1/1919 | Hale | 52—586 |
| 1,723,307 | 8/1919 | Sipe | 287—20.92 |
| 2,037,736 | 4/1936 | Payne et al. | 287—20.92 |
| 2,079,635 | 5/1937 | Sharp | 287—20.92 |
| 2,379,179 | 6/1945 | Petersen | 287—20.92 |
| 2,388,297 | 11/1945 | Slaughter | 52—586 |
| 2,392,551 | 1/1946 | Roe | 287—20.92 |
| 2,764,314 | 9/1956 | Mautner | 287—20.92 |
| 2,898,643 | 8/1959 | Bush et al. | 287—20.92 |
| 3,039,232 | 6/1962 | Dunn | 287—29.92 |

FOREIGN PATENTS

| 1,152,513 | 8/1963 | Germany. |
| 592,284 | 9/1947 | Great Britain. |
| 334,541 | 1/1959 | Switzerland. |
| 152,959 | 8/1953 | Australia. |
| 670,705 | 4/1952 | Great Britain. |

MARION PARSONS, Jr., *Primary Examiner.*